US007570788B2

(12) United States Patent
Tsukamoto et al.

(10) Patent No.: US 7,570,788 B2
(45) Date of Patent: Aug. 4, 2009

(54) PRINTED PAPER INSPECTING METHOD AND APPARATUS

(75) Inventors: Yoshio Tsukamoto, Kanagawa (JP); Akira Kurachi, Tokyo (JP)

(73) Assignee: Baldwin-Japan Ltd., Tokyo (JP)

( * ) Notice: Subject to any disclaimer, the term of this patent is extended or adjusted under 35 U.S.C. 154(b) by 519 days.

(21) Appl. No.: 10/773,982

(22) Filed: Feb. 5, 2004

(65) Prior Publication Data

US 2004/0156630 A1 Aug. 12, 2004

(30) Foreign Application Priority Data

Feb. 7, 2003 (JP) ............................ 2003-031427

(51) Int. Cl.
*G06K 9/00* (2006.01)

(52) U.S. Cl. .................... 382/112; 250/559.04; 358/1.1

(58) Field of Classification Search ................ 382/112; 250/554.04; 358/1.1
See application file for complete search history.

(56) References Cited

U.S. PATENT DOCUMENTS

| | | | | |
|---|---|---|---|---|
| 4,685,139 | A * | 8/1987 | Masuda et al. | 382/112 |
| 4,975,971 | A * | 12/1990 | Ohnishi | 382/112 |
| 5,144,566 | A | 9/1992 | Anderson | |
| 5,255,329 | A | 10/1993 | Tanimizu et al. | |
| 5,255,331 | A | 10/1993 | Kelly | |
| 5,384,859 | A | 1/1995 | Bolza-Schunemann et al. | |
| 5,712,921 | A | 1/1998 | Zabele | |
| 5,999,636 | A * | 12/1999 | Juang | 382/112 |
| 6,366,358 | B1 | 4/2002 | Satou et al. | |
| 6,535,621 | B1 | 3/2003 | Fujita | |
| 7,017,492 | B2 | 3/2006 | Seymour | |

FOREIGN PATENT DOCUMENTS

| | | |
|---|---|---|
| EP | 0194331 | 9/1986 |
| EP | 0533305 | 3/1993 |
| EP | 0795400 | 9/1997 |
| EP | 1 445 100 B1 | 10/2006 |
| GB | 2107047 | 4/1983 |
| JP | 3-270939 | 12/1991 |
| JP | 4-299147 | 10/1992 |
| JP | 04299147 | 10/1992 |
| JP | 7-121721 | 5/1995 |

* cited by examiner

*Primary Examiner*—Brian P Werner
*Assistant Examiner*—Katrina Fujita
(74) *Attorney, Agent, or Firm*—Day Pitney LLP

(57) ABSTRACT

A method comprises the step of reading multi level data of reference of each of colors from a printed paper on which images are printed to be good. The multi level data of reference are converted into two level data of reference so that two level data of images of reference can be reproduced in a memory from the two level data of reference. The method further comprises the step of reading multi level data of inspection of each of colors from a printed paper which is fed when inspecting. The multi level data of inspection are converted into two level data of inspection so that two level images of inspection can be reproduced in the memory from the two level data of inspection. The method further comprises the step of comparing the two level images of inspection with the two level images of reference for inspection of stained parts and blurred parts.

5 Claims, 8 Drawing Sheets

PRINTED PAPER INSPECTING METHOD AND APPARATUS

This application claims priority under 35 U.S.C. 119 on earlier filed Japanese Application No. 2003-31427, filed Feb. 7, 2003.

FIELD OF THE INVENTION

The invention relates to a method of and an apparatus for inspecting a printed paper on which images are printed repeatedly. In particular, the invention relates to the method and the apparatus which are useful for inspection of stained parts and blurred parts and inspection of shortage or excess of printed density.

PRIOR ART

Regarding a printed paper such as a news paper on which images are printed repeatedly by a printing press, an apparatus is generally combined with the printing press to inspect the printed paper. The apparatus should be useful for inspection of stained parts and blurred parts and inspection of shortage or excess of printed density. In this connection, the apparatus has heretofore been arranged to read multi level data of reference of each of colors from a printed paper on which images are printed to be good, and read multi level data of inspection of each of colors from a printed paper which is fed when inspecting. In addition, it has been conventional to compare the multi level data of inspection with the multi level data of reference at every pixel for inspection of stained parts and blurred parts. It has also been usual to compare the multi level data of inspection with the multi level data of reference at every pixel for inspection of shortage or excess of printed density.

However, this way must take a considerable time for inspection of stained parts and blurred parts and inspection of shortage or excess of printed density, to be low in efficiency. Furthermore, it is difficult to make a distinction between the inspection of stained parts or blurred parts and the inspection of shortage or excess of printed density when executing the inspections simultaneously by reason that each of the inspections is dependent on the comparison of the multi level data of inspection with the multi level data of reference.

By the way, Japanese Laid-Open Patent Publication No. 270,939 of 1991 discloses a method of inspecting a printed product, which calculates the number of dots corresponding to the pixels of print to find out the defects of print. Japanese-Laid-Open Patent Publication No. 299,147 of 1992 discloses an apparatus for inspecting a printed product, in which two level images are converted into distance images to determine it good or no good. Japanese Laid-Open Patent Publication No. 121,721 of 1995 discloses a method of inspecting a printed product, which compares the number of islands and the value of area with date of reference to appreciate the quality of print.

It is therefore an object of the invention to provide a method of and an apparatus for inspecting a printed paper on which images are printed repeatedly, the method and the apparatus overcoming the above problems.

Other object of the invention is to provide the method and the apparatus which are useful for inspection of stained parts and blurred parts and inspection of shortage or excess of printed density, to be high in efficiency without taking time.

Other object of the invention is to provide the method and the apparatus which can make a distinction between the inspection of stained parts or blurred parts and the inspection of shortage or excess of printed density without difficulty.

SUMMARY OF THE INVENTION

According to the invention, the method comprises the step of reading multi level data of reference of each of colors from a printed paper on which images are printed to be good. The multi level data of reference are converted into two level data of reference so that two level images of reference can be reproduced in a memory from the two level data of reference. The method further comprises the step of reading multi level data of inspection of each of colors from a printed paper which is fed when inspecting. The multi level data of inspection are converted into two level data of inspection so that two level images of inspection can be reproduced in the memory from the two level data of inspection. The method further comprises the step of comparing the two level images of inspection with the two level images of reference for inspection of stained parts and blurred parts.

In a preferred embodiment, the step of comparing includes the step of partitioning the two level images of reference and the two level images of inspection into parts to compare the two level images of inspection with the two level images of reference at every part.

The method further comprises the step of predetermining areas for decision of stained parts and blurred parts. The method further comprises the step of deciding on stained parts or blurred parts when the two level images of inspection include portions disagreeing with the two level images of reference and the portions have areas exceeding the areas for decision of stained parts or blurred parts.

The method further comprises the step of generating an alarm of stained parts or blurred parts when finding out the stained parts or blurred parts.

The method further comprises the step of detecting the positional variations of the printed paper at every page when the printed paper is fed, to compensate the two level images reproduced in the memory for the positional variations.

The method further comprises the step of predetermining a threshold of lowest stained density near a level of lowest printed density for inspection of stained parts. The method further comprises predetermining a threshold of highest blurred density near a level of highest printed density for inspection of blurred parts. The multi level data of reference and the multi level data of inspection are converted into the two level data of reference and the two level data of inspection by using the thresholds of lowest stained density and highest blurred density.

The method further comprises the stop of predetermining a limit of minus differential density independently of the threshold of lowest stained density for inspection of shortage of printed density at every pixel. The method further comprises the step of predetermining a limit of plus differential density independently of the threshold of highest blurred density for inspection of excess of printed density at every pixel. The method further comprises the step of predetermining areas for decision of shortage or excess of printed density. The method further comprises the step of comparing the multi level data of inspection with the multi level data of reference at every pixel for recognition of difference between the multi level data of reference and the multi level data of inspection. The method further comprises the step of deciding on shortage or excess of printed density when the difference exceeds the limit of minus differential density or plus differential density by portions having areas which exceed the areas for decision of shortage or excess of printed density.

The method further comprises the step of generating an alarm of shortage or excess of printed density when finding out the shortage or excess of printed density.

It should therefore be recognized that the method comprises the step of predetermining a threshold of lowest stained density near a level of lowest printed density for inspection of stained parts. It is preferable that the threshold of lowest stained density is disposed above the level of lowest printed density. The method further comprises the step of predetermining a threshold of highest blurred density near a level of highest printed density for inspection of blurred parts. It is preferable that the threshold of highest blurred density is disposed below the level of highest printed density. The method further comprises the step of predetermining a limit of minus differential density independently of the threshold of lowest stained density for inspection of shortage of printed density it is preferable that the limit of minus differential density is disposed above the threshold of lowest stained density. The method further comprises the step of predetermining a limit of plus differential density independently of the threshold of highest blurred density for inspection of excess of printed density. It is preferable that the limit of plus differential density is disposed below the threshold of highest blurred density. The method further comprises the step of reading multi level data of reference of each of colors from a printed paper on which images are printed to be good. The method further comprises the step of reading multi level data of inspection of each of colors from a printed paper which is fed when inspecting. The method further comprises the step of using the multi level data of reference, the multi level data of inspection, the threshold of lowest stained density and the threshold of highest blurred density for inspection of stained parts or blurred parts. The method further comprises the step of using the multilevel data of reference, the multi level data of inspection, the limit of minus differential density and the limit of plus differential density for inspection of shortage or excess of printed density.

The limit of lowest stained density may comprise the threshold of lowest stained density. The limit of highest blurred density may comprise the threshold of highest blurred density. The multi level data of reference may be converted into the two level date of reference when exceeding the threshold of lowest stained density or highest blurred density.

Furthermore, according to the invention, the apparatus comprises data reading means for reading multi level data of reference of each of colors from a printed paper on which images are printed to be good, and reading multi level data of inspection of each of colors from a printed paper which is fed when inspecting. The apparatus further comprises data processing means by which the multi level data of reference are converted into two level data of reference. The multi level data of inspection are converted into two level data of inspection by the data processing means. The apparatus further comprises a memory in which two level images of reference are reproduced from the two level data of reference. Two level images of inspection are reproduced in the memory from the two level data of inspection. The apparatus further comprises comparing means for comparing the two level images of inspection with the two level images of reference for inspection of stained parts and blurred parts.

In the embodiment, the comparing means is arranged to partition the two level images of reference and the two level images of inspection into parts to compare the two level images of inspection with the two level images of reference at every part.

The apparatus further comprises predetermining means for predetermining areas for decision of stained parts or blurred parts. The apparatus further comprises deciding means for deciding on stained parts or blurred parts when the two level images of inspection include portions disagreeing with the two level images of reference and the portions have areas exceeding the areas for decision of stained parts or blurred parts.

The apparatus further comprise alarm means for generating an alarm of stained parts or blurred parts when finding out the stained parts or blurred parts.

The apparatus further comprises predetermining means for predetermining a threshold of lowest stained density near a level of lowest printed density for inspection of stained parts and predetermining a threshold of highest blurred density near a level of highest printed density for inspection of blurred parts. The multi level data of reference and the multi level data of inspection are converted into two level data of reference and two level data of inspection by using the thresholds of lowest stained density and highest blurred density.

The apparatus further comprises predetermining means for predetermining a limit minus of differential density independently of the threshold of lowest stained density for inspection of shortage of printed density and predetermining a limit of plus differential density independently of the threshold of highest blurred density for inspection of excess of printed density. The apparatus further comprises predetermining means for predetermining areas for decision of shortage or excess of printed density. The apparatus further comprises comparing means for comparing the multi level data of inspection with the multi level data of reference at every pixel for recognition of difference between the multi level data of reference and the multi level data of inspection. The apparatus further comprises deciding means for deciding on shortage or excess of printed density when the difference exceeds the limit of minus differential density or plus differential density by portions having areas which exceed the areas for decision of shortage or excess of printed density.

The apparatus further comprises an alarm means for generating an alarm of shortage or excess of printed density when finding out the shortage or excess of printed density.

DETAILED DESCRIPTION OF THE PREFERRED EMBODIMENTS

Figure 1:
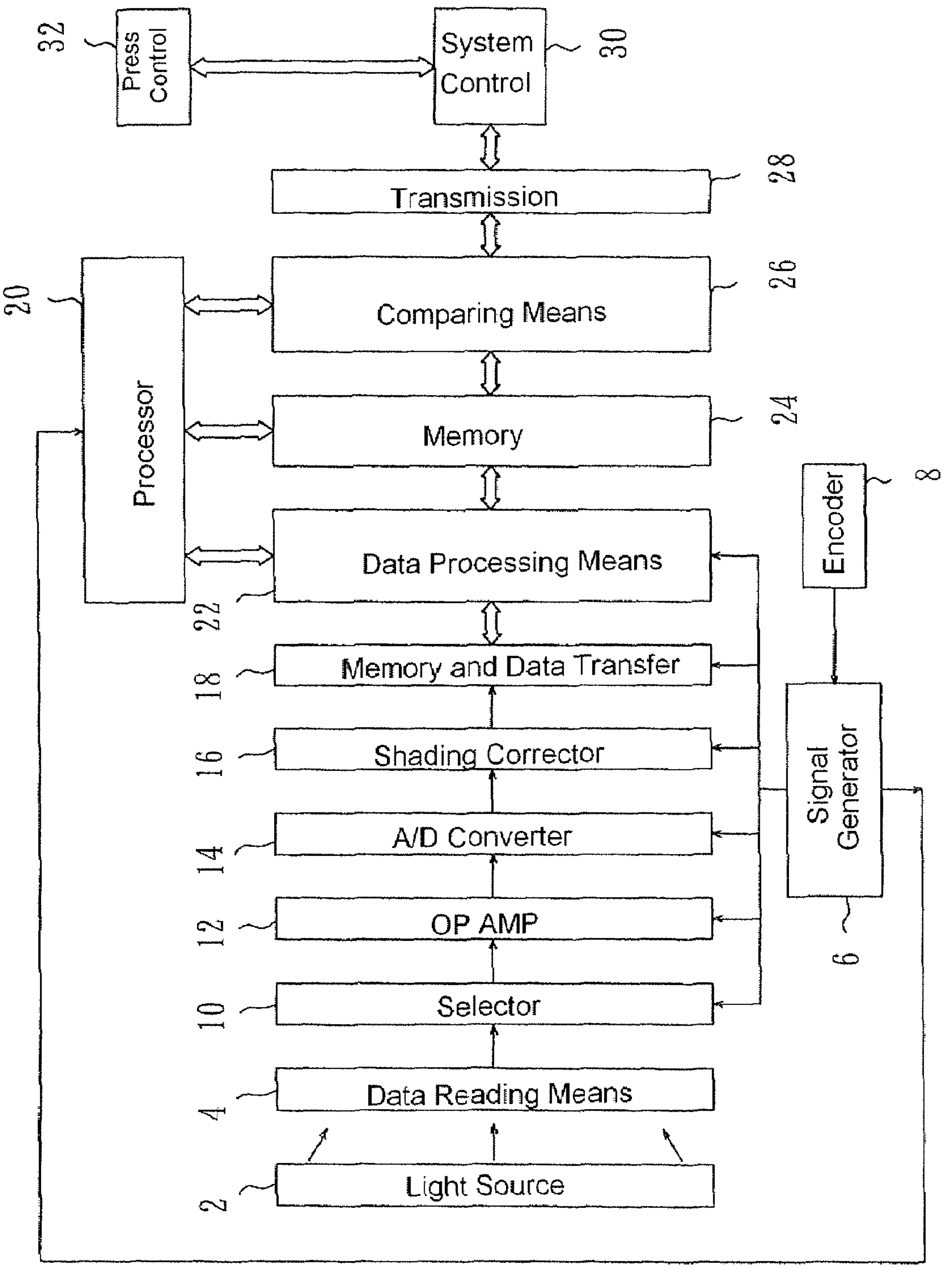
FIG. 1 is a block diagram of a preferred embodiment of the invention.

Turning now to the drawings, FIG. 1 illustrates an apparatus for inspecting a printed paper such as a news paper on which images are printed repeatedly by a printing press, according to the invention. The apparatus includes red, blue and green light sources or a white light source 2 by which the printed paper is illuminated. The apparatus further includes data reading means 4 for reading multi level data of reference of each of colors from a printed paper on which images are printed to be good, and reading multi level data of each of colors from a printed paper which is fed when inspecting.

A signal generator 6 generates timing and clock signals in response to a detecting signal fed from a rotary encoder 8 detecting the rotation of printing press. The timing and clock signals are fed to a selector 105 an operational amplifier 12, an A/D converter 14, a shading corrector 16 and a memory and data transferring part 18. The multi level data of reference and the multi level data of inspection tare fed from the data reading means 4, taken selectively by the selector 10, amplified by the operational amplifier 12, converted into digital codes by the A/D converter 14, standard white levels corrected by the shading corrector 16 and stored in the memory and data transferring part 18.

The apparatus further includes a processor 20, data processing means 22, a memory 24 and comparing means 26. The processor 20 comprises a CPU for controlling the whole apparatus by executing a soft ware for performance of function of the data processing means 22, the memory 24 and the comparing means 26. Furthermore, the timing and clock signals are fed to the data processing means 22 by which the multi level data of reference are converted into two level data of reference to that two level images of reference can be reproduced in the memory 24 from the two level data of reference. In addition, the multi level data of inspection are converted into two level data of inspection by the data processing means 22. Two level images of inspection are reproduced in the memory 24 from the two level data of inspection.

The comparing means 26 compares the two level images of inspection with the two level images of reference for inspection of stained parts and blurred parts. In the embodiment, the comparing means 26 including predetermining means for predetermining areas for decision of stained parts or blurred parts. The comparing means 26 further including deciding means for deciding on stained parts or blurred parts when the two level images of inspection include portions disagreeing with the two level images of reference and the portions have areas exceeding the areas for decision of stained parts or blurred parts.

Figure 2:
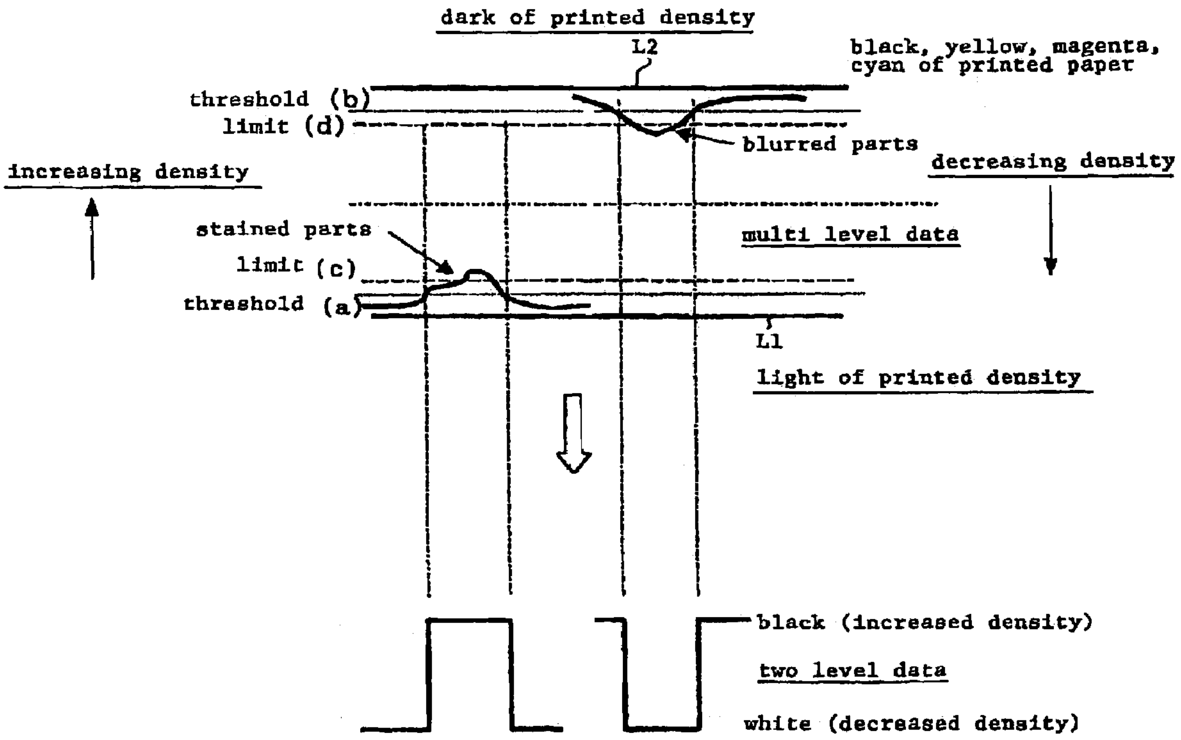
FIG. 2 is an explanatory view of multi level data converted into two level data in the apparatus of FIG. 1.

As to the multi level data of reference and the multi level data of inspection converted into the two level data of reference and the two level data of inspection, the data processing means 22 includes predetermining means for predetermining a threshold (a) of lowest stained density near a level (L1) of lowest printed density for inspection of stained parts and predetermining a threshold (b) of highest blurred a density near a level (L2) of highest printed density for inspection of blurred parts, as shown in FIG. 2. The threshold (a) of lowest stained density is disposed above the level (L1) of lowest printed density. The threshold (b) of highest blurred density is disposed below the level (L2) of highest printed density. The multi level data of reference and the multi level data of inspection are converted into the two level data of reference and the two level data of inspection by using the thresholds (a) and (b) of lowest stained density and highest blurred density. In the embodiment, the multi level data of reference and the multi level data of inspections are converted into the two level data of reference and the two level data of inspection when exceeding the threshold (a) or (b).

Figure 3:
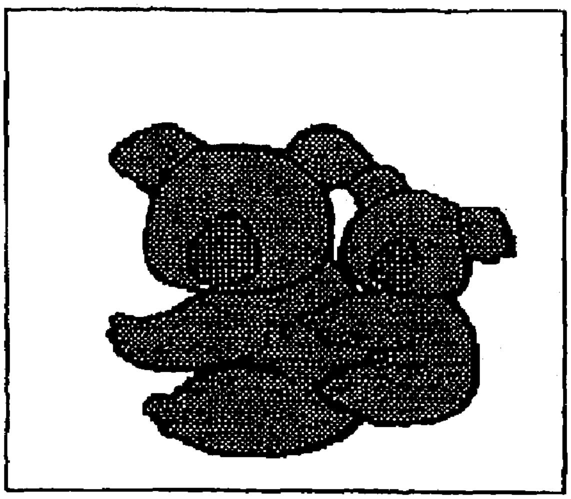
FIG. 3 is an explanatory view of images printed to be good on a printed paper for establishing a reference for inspection of stained parts and blurred parts.
Figure 4:
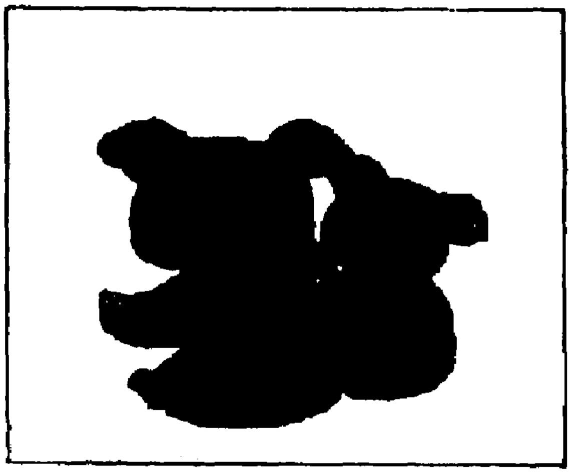
FIG. 4 is an explanatory view of two level images of reference at the threshold of lowest stained density.
Figure 5:
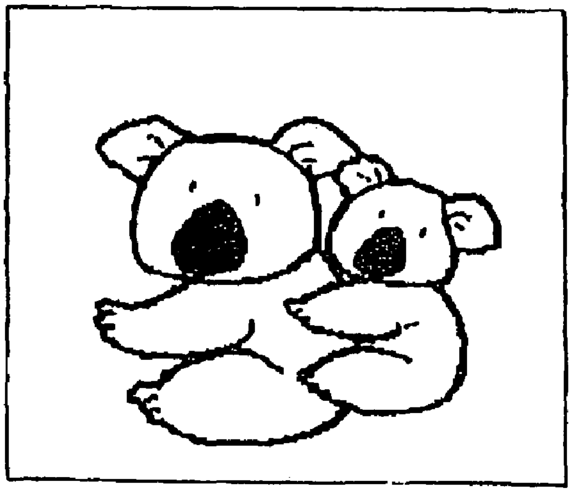
FIG. 5 is an explanatory view of two level images of reference at the threshold of highest blurred density.
Figure 6:
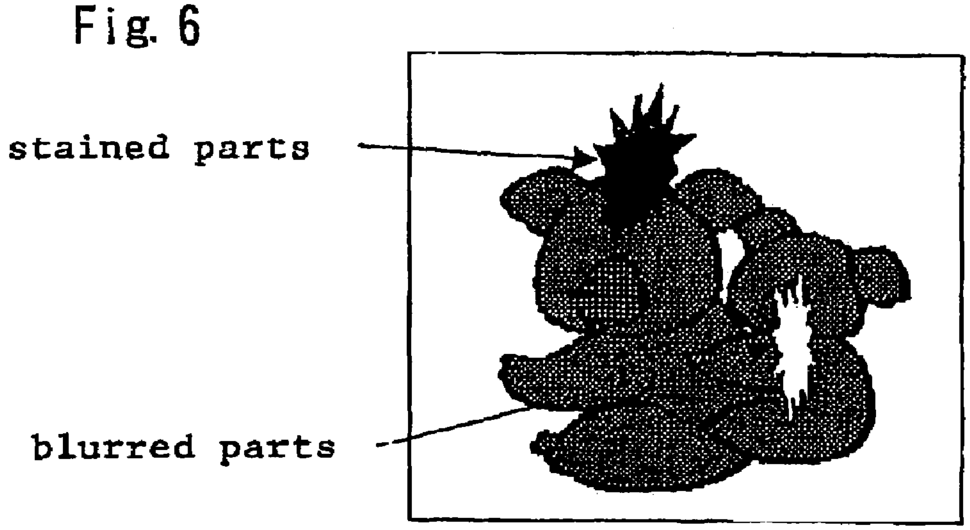
FIG. 6 is an explanatory view of images printed for inspection and including stained parts and blurred parts.
Figure 7:
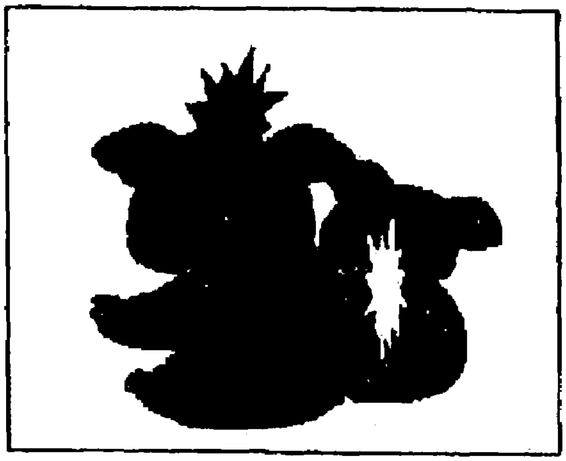
FIG. 7 is an explanatory view of two level images of inspection at the threshold of lowest stained density.
Figure 8:
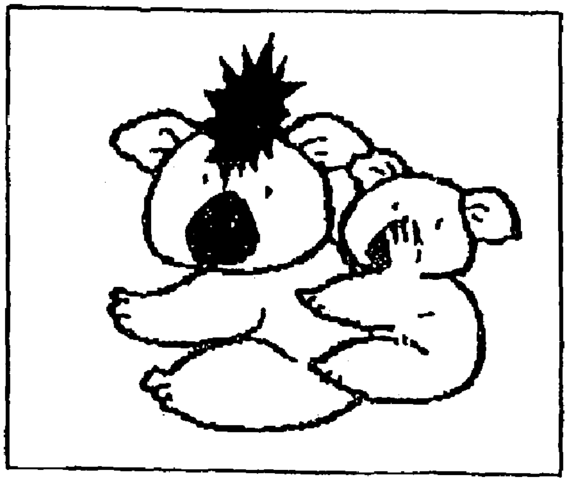
FIG. 8 is an explanatory view of two level images of inspection at the threshold of highest blurred density.

For example, FIG. 3 illustrates the images printed to be good on a printed paper for establishing a reference for inspection of stained parts and blurred parts. FIG. 4 illustrates the two level data of reference at the threshold (a) of lowest stained density. FIG. 5 illustrates the two level data of reference at the threshold (b) of highest blurred density. On the other hand, FIG. 6 illustrates the images printed for inspection and including stained parts and blurred parts. In this case, two level images of inspection are obtained to include stained parts at the threshold (a) of lowest stained density, as shown in FIG. 7. Furthermore, two level images of inspection are obtained to include blurred parts at the threshold (b) of highest blurred density, as is shown in FIG. 8. It should therefore be understood that the apparatus compares thee two level images of FIG. 7 with the two level images of FIG. 4 to recognize that the two level images of FIG. 7 includes portions disagreeing with the two level images of FIG. 4. Furthermore, the apparatus compares the two level images of FIG. 8 with the two level images of FIG. 5 to recognize that the two level images of FIG. 8 includes portions disagreeing with the two level images of FIG. 5. The apparatus then decides on stained parts or blurred parts, when the portions have areas exceeding the areas for decision of stained parts or blurred parts.

In the embodiment, the data processing means 22 further includes predetermining means for predetermining a limit (c) of minus differential ensity independently of the threshold (a) of lowest stained density for inspection of shortage of printed density and predetermining a limit (d) of plus of differential density independently of the threshold (b) of highest blurred density for inspection of excess of printed density. The limit (c) of minus differential density is disposed above the threshold (a) of lowest stained density. The limit (d) of plus differential density is disposed below the threshold (b) of highest blurred density. The comparing means 26 further includes predetermining means for predetermining areas for decision of shortage or excess of printed density. In addition, the comparing means 26 is arranged to compare the multi level data of inspection with the multi level data of reference at every pixel for recognition of difference between the multi level data of reference and the multi level data of inspection. The comparing means 26 further includes deciding means for deciding on shortage or excess of printed density when the difference exceeds the limit (c) or (d) of minus differential density or plus differential density by portions having areas which exceed the areas for decision of shortage or excess of printed density.

Figure 9:
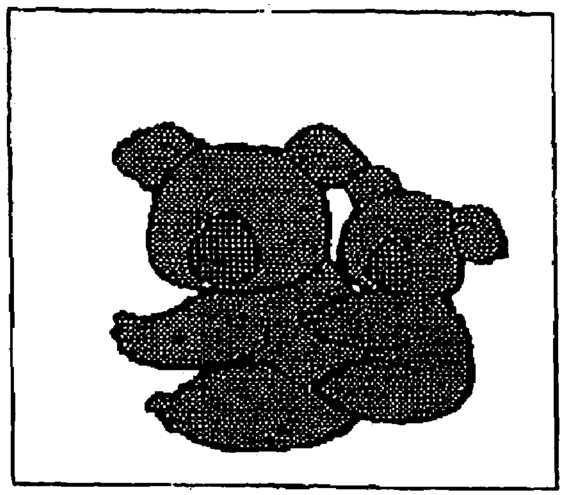
FIG. 9 is an explanatory view of images printed to be good on a printed paper for establishing a reference for inspection of shortage or excess of printed density.
Figure 10:
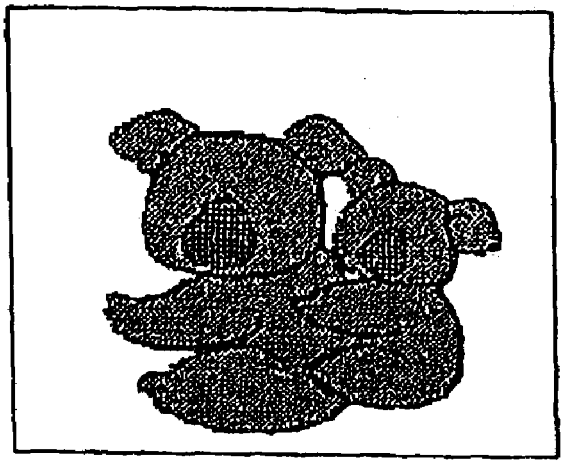
FIG. 10 is an explanatory view of multi level images of inspection at the limit of minus differential density.
Figure 11:
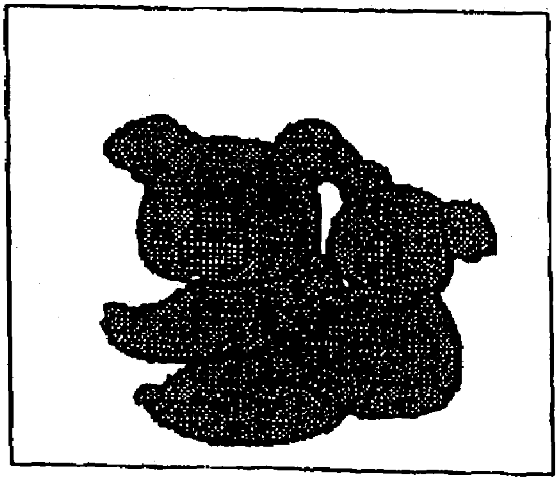
FIG. 11 is an explanatory view of multi level images of inspection at the limit of plus differential density.

In this connection, FIG. 9 illustrates the images printed to be good on the printed paper for establishing a reference for inspection of shortage or excess of printed density. FIG. 10 illustrates multi level images of inspection at the limit (c) of minus differential density. FIG. 11 illustrates multi level images of inspection at the limit (d) of plus differential density.

It should therefore be recognized that the apparatus includes predetermining means for predetermining a threshold (a) of lowest stained density near a level (L1) of lowest printed density for inspection of stained parts and predetermining a threshold (b) of highest blurred density near the level (L2) of highest printed density for inspection of blurred parts. The threshold (a) of lowest stained density is disposed above the level (L1) of lowest printed density. The threshold (b) of highest blurred density is disposed below the level (L2) of highest printed density. The apparatus further includes predetermining means for predetermining the limit (c) of minus differential density independently of the threshold (a) of lowest stained density for inspection of shortage of printed density and predetermining the limit (d) of plus differential density independently of the threshold (b) of highest blurred density for inspection of excess of printed density. The limit (c) of minus differential density is disposed above the threshold (a) of lowest stained density. The limit (d) of plus differential density is disposed below the threshold (b) of highest blurred density. The apparatus is arranged to use the multi level data of reference, the multi level data of inspection, the threshold (a) of lowest stained density and the threshold (b) of highest blurred density for inspection of stained parts and blurred parts. The apparatus is further arranged to use the multi level data of reference, the multi level data of inspection, the limit (c) of minus differential density end the limit (d) of plus of differential density for inspection of shortage or excess of printed density.

It should also be recognized that in the embodiment, the threshold (a) of lowest stained density comprises the threshold of lowest stained density. The threshold (b) of highest blurred density comprises the threshold of highest blurred density. In addition, the multi level data of reference are converted into the, two level data of reference when exceeding the threshold (a) or (b) of lowest stained density or highest blurred density. The multi level data of inspection are converted into the two level data of inspection when exceeding the threshold (a) or (b) of lowest stained density or highest blurred density, as described above. Furthermore, the two level images of reference and inspection are reproduced in the memory from the two level data of reference and inspection, to compare the two level images of inspection with the two level images of reference for inspection of stained parts or blurred parts, as also described above.

Accordingly, unlike the prior art, the apparatus is not required to compare the multi level data of inspection with the multi level data of reference at every pixel for inspection of stained parts and blurred parts. The apparatus is merely required to compare the two level images of inspection with the two level images of reference for inspection of stained parts and blurred parts. The apparatus is therefore useful for inspection of stained parts and blurred parts and inspection of shortage or excess of printed density, to be high in efficiency without taking time.

Furthermore, the apparatus is arranged to use the thresholds (a) and (b) for inspection of stained parts and blurred parts, and use the limits (c) and (d) independent of the limits (a) and (b) for inspection of shortage or excess of printed density. In addition, the inspection of stained parts and blurred parts is dependent on the comparison of the two level images of inspection with the two level images of reference. The inspection of shortage or excess of printed density is dependent on the comparison of the multi level data of inspection with the multi level data of reference. The apparatus can therefore make a distinction between the inspection of stained parts or blurred parts and the inspection of shortage or excess of printed density without difficulty.

Figure 12:
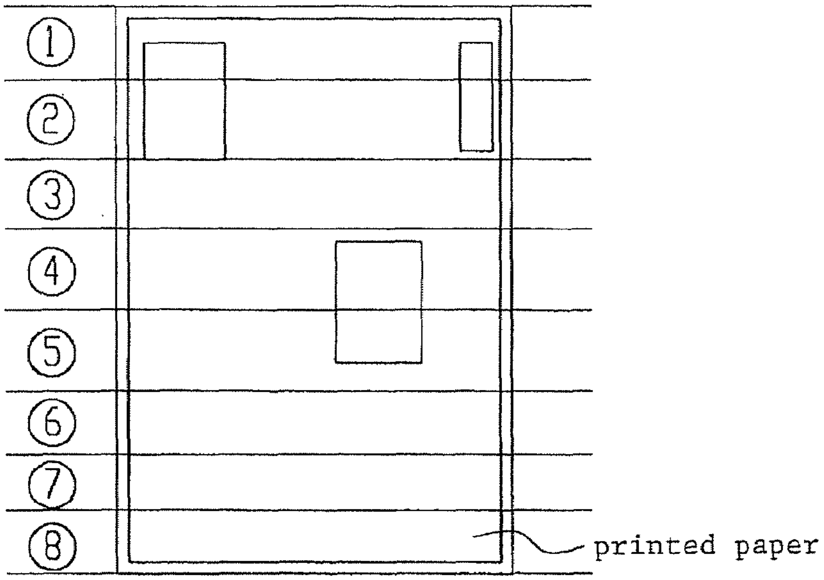
FIG. 12 is an explanatory view of the step of partitioning the two level images into parts.

Furthermore, in the embodiment, the comparing means 26 is arranged to partition the two level images of reference and the two level images of inspection into parts (1) to (8), as shown in FIG. 12, to compare the two level images of inspection with the two level images of reference at every part. The two level images of reference and the two level images of inspection are stored in the memory 24 at every part for comparison of them with each other at every pixel. This arrangement can save time for storage and comparison of the two level images and decision of stained parts or blurred parts, to improve efficiency.

In this connection, it is preferable to predetermine the area of each of the parts (1) to (8) to effectively save the time for storage, comparison and decision. It should be understood that the time is lengthen in proportion to the increase of the area. The parts (1) to (8) can be stored at positions, with sizes and in a sequence which are selected by executing the soft ware for controlling. The parts (1) to (8) may include specific small ones with increased number to partially speed up the decision.

The apparatus further includes a transmission part 28 for transmitting information to a system control part 30 from the comparing and deciding means 13. The information includes the decision of stained parts or blurred parts and the decision of shortage or excess of printed density. The information further includes the page, position, size and degree of stained parts or blurred parts and shortage or excess of printed density. The information further includes control data of apparatus. The system control part 30 transmits a command for start, end and emergency stop of inspection to a press control part 32 in response to the control data.

The system control part 30 includes alarm means for generating an alarm of stained parts or blurred parts when finding out the stained parts or blurred parts. The system control part 30 further includes alarm means for generating an alarm of shortage or excess of printed density when finding out the shortage or excess of printed density.

In addition, the system control part 30 includes a screen for indicating information about the display of pages printed by the printing press. The screen is changed to indicate the page, position; size and degree of stained parts or blurred part and shortage or excess of printed density when finding out. The system control part 30 is arranged to predetermine parameters of inspection when waiting.

The press control part 32 has a function of control of printing press and transmits information to the inspection apparatus when waiting. The information includes the display of pages and positions to be printed and the number of printing plate.

Furthermore, the apparatus may be arranged to detect the positional variations of the printed paper at every page when the printed paper is fed, to compensate the two level images reproduced in the memory for the positional variations.

Figure 13:
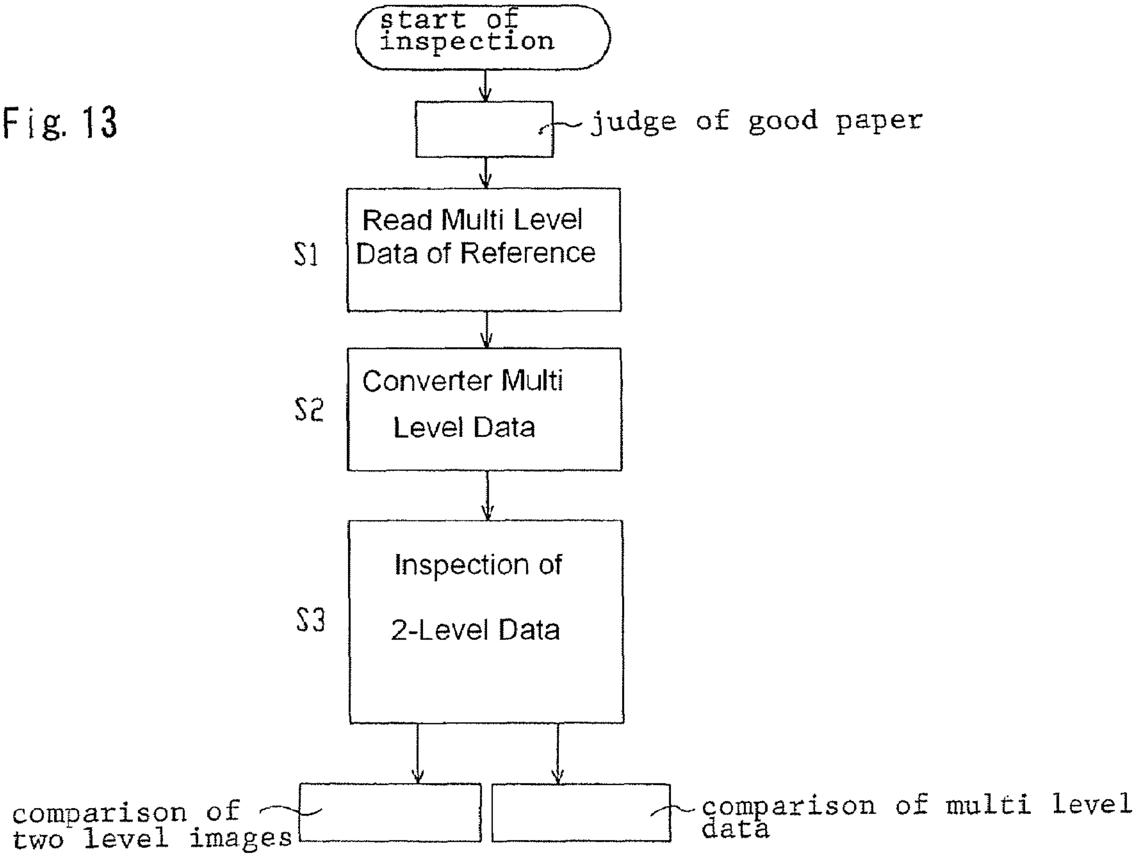
FIG. 13 is a flow chart of inspection.

In the embodiment, the apparatus generates a start signal for start of inspection, as shown in FIG. 13. The apparatus then reads multi level data of reference of each of colors from a printed paper and partition the multi level data of reference into 1/n parts of 1 page when an operator judges that images are printed on the printed paper to be good so that the multi level data of reference can be stored at every 1/n part in the memory (S 1). The multi level data of reference are converted into two level data of reference by using the thresholds (a) and (b) of FIG. 2 so that the two level images of reference can be reproduced at every 1/n part in the memory (S 2). Printed papers are then fed successively for inspection. The apparatus reads multi level data of inspection of each of colors from the printed paper and partition the multi level data of inspection into 1/n parts of 1 page. The multi level data of inspection are stored at every 1/n part in the memory and converted into two level data of inspection by using the thresholds (a) and (b), so that the two level images of inspection can be reproduced at every 1/n part in the memory (S 3) for comparison of two level images and comparison of multi level data.

Figure 14:
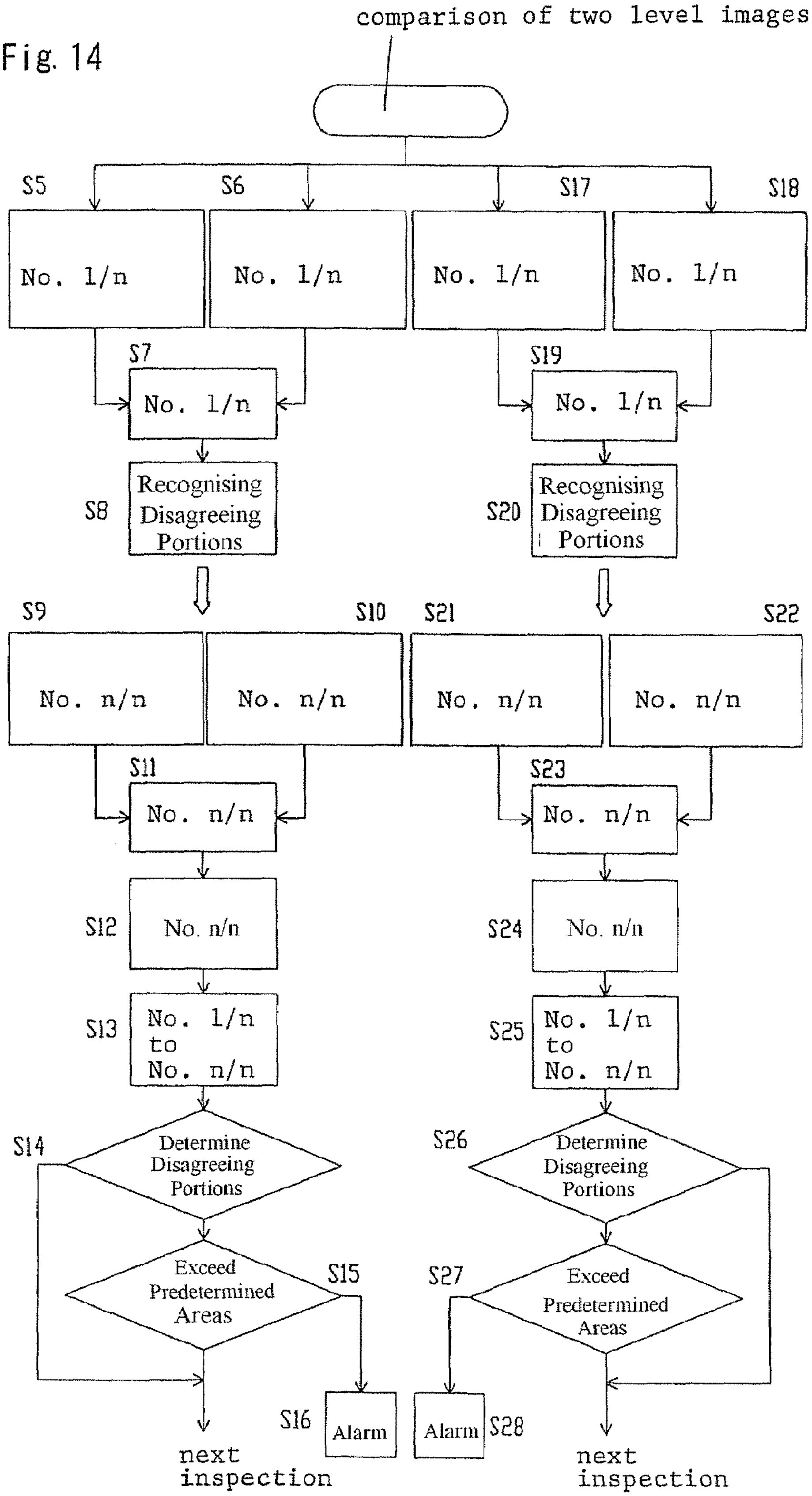
FIG. 14 is a flow chart of comparison of two level images.

As to the comparison of two level images, the apparatus extracts the two level images of reference of No. 1/n part relating to the threshold (a) from the memory (S 5) and the two level images of inspection of No. 1/n part relating to the threshold (a) from the memory (S 6) to compare them with each other (S 7), as shown in FIG. 14. The apparatus then recognizes whether the two level images of inspection include portions disagreeing with the two level images of reference or not and recognizes where the portions are positioned and what areas the portions have so that the positions and areas of disagreeing portions can be stored in the memory (S 8). The same steps are accomplished repeatedly at every 1/n part toward the two level images of reference and inspection of No. n/n part (S 9 to S 12). The apparatus then collects the results of inspection (S 13) to determine whether the positions and areas of disagreeing portions are present or not (S 14) and makes a change to the next inspection when being not present. The apparatus further determines whether the collecting areas of disagreeing portions exceed the predetermined areas or not (S 15) and make a change to the next inspection when not exceeding. The apparatus generates an alarm of stained parts when exceeding (S 16).

Furthermore, the apparatus extracts the two level images of reference of No. 1/n part relating to the threshold (b) from the memory (S 17) and the two level images of inspection of No. 1/n part relating to the threshold (b) from the memory (S 18) to compare them with each other (S 19). The apparatus then recognizes whether the two level images of inspection include portions disagreeing with the two level images of reference or not and recognizes where the portions are positioned and what areas the portions have so that the positions and areas of disagreeing portions can be stored in the memory (S20). The same steps are accomplished repeatedly at every 1/n part toward the two level images of reference and inspection of No. n/n part (S 21 to S 24). The apparatus then collects the results of inspection (S 25) to determine whether the positions and areas of disagreeing portions are present or not (S 26) and makes a change to the next inspection when being not present. The apparatus further determines whether the collecting areas of disagreeing portions exceed the predetermined areas or not (S 27) and make a change to the next inspection when not exceeding. The apparatus generates an alarm of blurred parts when exceeding (S 28).

It should be understood that what is meant by the positions of disagreeing portions in the steps (S 8 and S 20) is X and Y coordinate values of disagreeing pixels. The areas comprise the collection of adjacent disagreeing pixels, that is, X1 to Xn and Y1 to Yn pixels. These indicate the positions and sizes of stained parts in the case of threshold (a) and the positions and sizes of blurred parts in the case of threshold (b). The apparatus is arranged to predetermine the sizes (number of pixels) for generating the alarm only when exceeding the sizes. In addition, the apparatus is arranged to indicate the positions and sizes of stained or blurred parts in the 1/n to n/n parts of page when generating the alarm.

Figure 15:
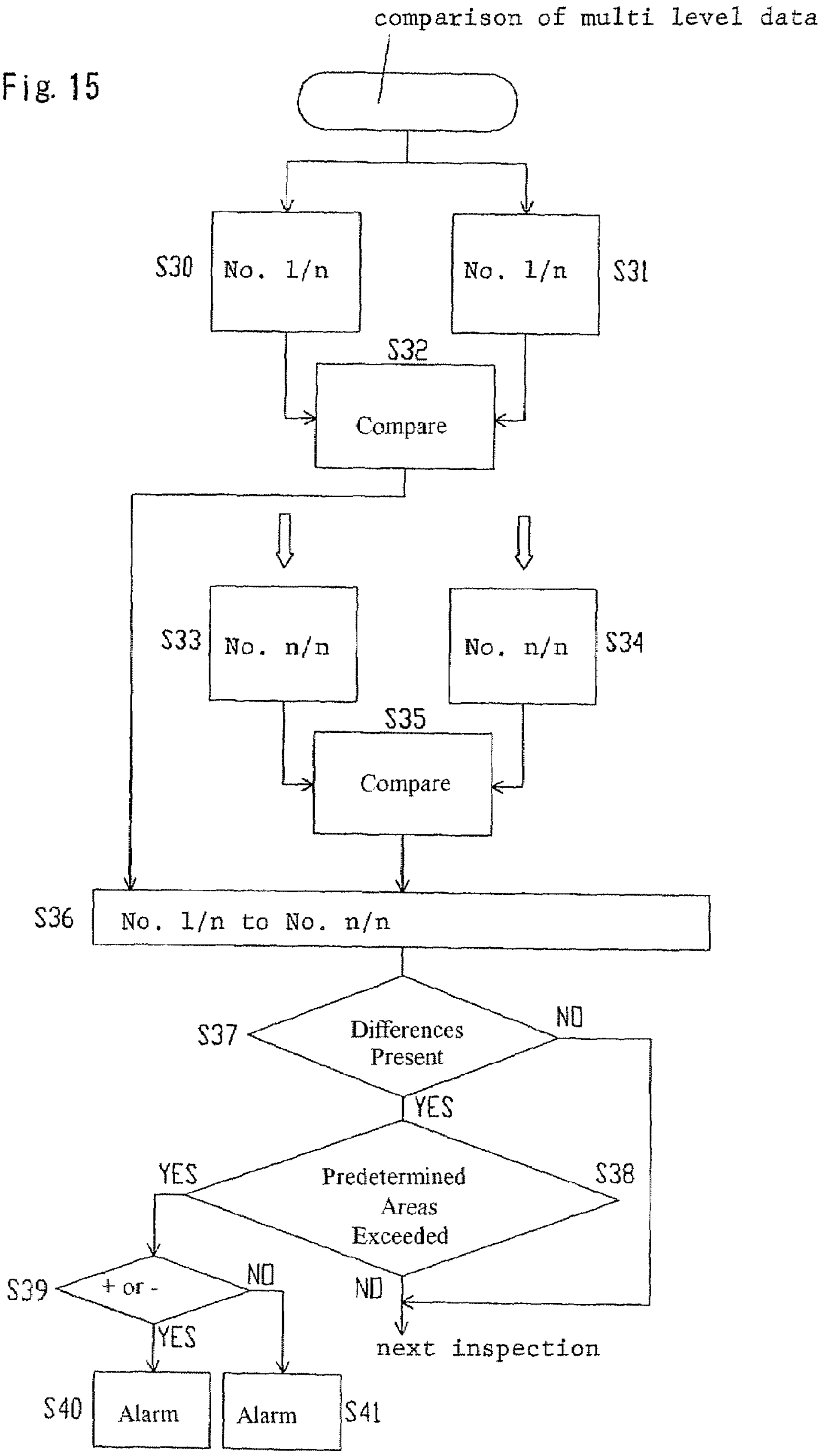
FIG. 15 is a flow chart of comparison of multi level data.

As to the comparison of multi level data, the apparatus extracts the multi level data of reference of No. 1/n part from the memory (S 30) and the multi level data of inspection of No. 1/n part from the memory (S 31) to compare them with each other at every pixel for recognition of difference between the multi level data of reference and the multi level data of inspection so that the positions and areas of difference can be stored in the memory (S 32), as shown in FIG. 15. The same steps are accomplished repeatedly at every 1/n part toward the multi level data of reference and inspection of No. n/n part (S 33 to S 35). The apparatus then collects the results of inspection (S 36) to determine whether the positions and areas of difference are present or not (S 37) and make a change to the next inspection when being not present. The apparatus further determines whether the collecting areas of difference exceed the predetermined areas or not (S 38) and make a change to the next inspection when not exceeding. The apparatus further determine whether the difference is plus or minus (S 39) to generate an alarm of excess of printed density when being plus (S 40) and generate an alarm of shortage of printed density when being minus (S 41).

It is preferable to generate the alarms of excess and shortage of printed density by marks different from each other, to indicate the marks alternatively when finding out the excess and shortage of printed density on the same page.

The apparatus compares the two level data and the multi level data repeatedly up to the end of printing.

What is claimed is:

1. A method of inspecting a printed paper on which images are printed repeatedly, the method comprising the steps of:

predetermining a first threshold of lowest stained density near a first level of lowest printed density for inspection of stained parts;

predetermining a second threshold of highest blurred density near a second level of highest printed density for inspection of blurred parts;

reading multi valued data of reference of each color from a printed paper, the multi valued data of reference being converted into monochrome data of reference by using the first and second thresholds of lowest stained density and highest blurred density so that monochrome images of reference can be stored in a memory from the monochrome data of reference;

reading multi valued data of inspection of each color from a printed paper which is fed when inspecting, the multi valued data of inspection being converted into monochrome data of inspection by using the first and second threshold of lowest stained density and highest blurred density so that monochrome images of inspection can be stored in the memory from monochrome data of inspection;

comparing the monochrome images of inspection with the monochrome images of reference for inspection of stained parts and blurred parts;

predetermining first areas for decision of stained parts or blurred parts;

recognizing whether the monochrome images of inspection include portions disagreeing with the monochrome images of reference or not, where the portions are positioned, what areas the portions have, and deciding on stained parts or blurred parts when the portions have actual areas exceeding the first areas for decision of stained parts or blurred parts, the first areas comprising a collection of adjacent disagreeing pixels;

predetermining a first limit of minus differential density independently of the first threshold of lowest stained density for inspection of shortage of printed density at every pixel, the first limit of minus differential density being disposed above the first threshold of lowest stained density;

predetermining a second limit of plus differential density independently of the second threshold of highest blurred density for inspection of excess of printed density at every pixel, the second limit of plus differential density being disposed below the second threshold of highest blurred density, the first and second thresholds and the first and second limits having different numerical values from one another;

comparing the multi-valued data of inspection with the multi-valued data of reference at every pixel for recognition of difference between the multi-valued data of reference and the multi-valued data of inspection;

predetermining second areas for decision of shortage or excess of printed density;

deciding on shortage or excess of printed density when the difference exceeds the first or second limit of minus differential density or plus differential density by portions having actual areas which exceed the second areas for decisions of shortage or excess of printed density; and executing the inspection and decision of stained parts and blurred parts and the inspection and decision of shortage and excess of printed density simultaneously.

2. The method as set forth in claim 1 wherein the step of comparing includes a step of partitioning the monochrome images of reference and the monochrome images of inspection into parts to compare the monochrome images of inspection with the monochrome images of reference at every part.

3. The method as set forth in claim 1 further comprising the step of generating an alarm of stained parts or blurred parts when finding stained parts or blurred parts.

4. The method as set forth in claim 1 further comprising the step of detecting positional variations of the printed paper at every page when the printed paper is fed, to compensate for the positional variations the monochrome images stored in the memory.

5. The method as set forth in claim 1 further comprising the step of generating an alarm of shortage or excess of printed density when finding shortage or excess of printed density.

* * * * *